United States Patent Office 3,574,851
Patented Apr. 13, 1971

3,574,851
FUNGICIDAL METHOD EMPLOYING NEW QUATERNARY AMMONIUM HALIDES
Asher A. Hyatt, Lexington, Mass., assignor to Monsanto Research Corporation, St. Louis, Mo.
No Drawing. Original application Dec. 3, 1965, Ser. No. 531,320, now Patent No. 3,390,178, dated June 25, 1968. Divided and this application Dec. 20, 1967, Ser. No. 721,893
Int. Cl. A01n 9/20
U.S. Cl. 424—329
2 Claims

ABSTRACT OF THE DISCLOSURE

A method of controlling soil fungi employing certain new nitroso substituted aryl derivatives of trialkyl ammonium halides.

This is a division of application Ser. No. 531,320 filed Dec. 3, 1965, now Patent No. 3,390,178.

This invention relates to the reaction of nitroso substituted aromatic hydrocarbon derivatives of dialkylamines with alkyl halides and to the products thereof.

It is an object of this invention to provide new nitroso substituted aryl derivatives of trialkyl ammonium halides.

It is another object of this invention to provide compounds useful as biological toxicants such as fungicides, plant growth regulators, defoliants, insecticides and bactericides.

According to the invention, there are prepared new and useful compounds having the formula:

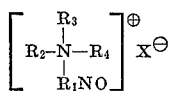

wherein $R_1$ represents bivalent aromatic hydrocarbon radicals of from 6 to 12 carbon atoms, each of $R_2$, $R_3$, and $R_4$ represents alkyl radicals free of aliphatic unsaturation of from 1 to 6 carbon atoms and X represents a halogen element of atomic weight below 130.

Preparation of the presently provided novel compounds is effected by contacting the alkyl halide with the nitroso substituted aromatic hydrocarbon derivative, according to the following equation:

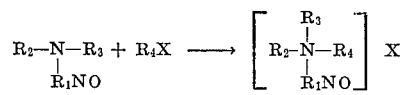

wherein $R_1$, $R_2$, $R_3$, $R_4$ and X are as defined above.

There are shown below a number of the specific new compounds of the invention. It is not intended that this be a complete listing of all compounds of the invention, but that it merely be illustrative thereof:

trimethyl(p-nitrosophenyl)ammonium iodide,
triethyl(o-nitrosophenyl)ammonium bromide,
tripropyl(m-nitrosophenyl)ammonium chloride,
tributyl(p-nitrosophenyl)ammonium fluoride,
tripentyl(o-nitrosophenyl)ammonium iodide,
trihexyl(m-nitrosophenyl)ammonium bromide,
dimethylhexyl(p-nitrosophenyl)ammonium chloride,
dihexylmethyl(o-nitrosophenyl)ammonium fluoride,
diethylpentyl(m-nitrosophenyl)ammonium iodide,
butyldipropyl(p-nitrosophenyl)ammonium bormide,
butylhexylmethyl(o - nitrosophenyl)ammonium chloride,
trimethyl(4-nitrosotolyl)ammonium fluoride,
triethyl(4-nitrosotolyl)ammonium iodide,
tripropyl(4-nitrosotolyl)ammonium bromide,
tributyl(4-nitrosotolyl)ammonium chloride,
tripentyl(4-nitrosotolyl)ammonium fluoride,
trihexyl(4-nitrosotolyl)ammonium bromide,
dimethylhexyl(4-nitrosotolyl)ammonium chloride,
dihexylmethyl(4-nitrosotolyl)ammonium iodide,
diethylpentyl(4-nitrosotolyl)ammonium fluoride,
butyldipropyl(4-nitrosotolyl)ammonium bromide,
butylhexylmethyl(4-nitrosotolyl)ammonium chloride,
trimethyl(4-nitrosoxylyl)ammonium fluoride,
triethyl(4-nitrosoxylyl)ammonium chloride,
tripropyl(4-nitrosoxylyl)ammonium bromide,
tributyl(4-nitrosoxylyl)ammonium iodide,
tripentyl(4-nitrosoxylyl)ammonium fluoride,
trihexyl(4-nitrosoxylyl)ammonium chloride,
dimethylhexyl(4-nitrosoxylyl)ammonium fluoride,
dihexylmethyl(4-nitrosoxylyl)ammonium chloride,
diethylphentyl(4-nitrosoxylyl)ammonium bromide,
butyldipropyl(4-nitrosoxylyl)ammonium iodide,
butylhexylmethyl(4-nitrosoxylyl)ammonium fluoride,
trimethyl(4-nitrosonaphthyl)ammonium iodide,
triethyl(5-nitrosonaphthyl)ammonium fluoride,
tripropyl(6-nitrosonaphthyl)ammonium chloride,
tributyl(4-nitrosonapththyl)ammonium bromide,
tripentyl(5-nitrosonaphthyl)ammonium iodide,
trihexyl(6-nitrosonaphthyl)ammonium fluoride,
dimethylhexyl(4 - nitrosonaphthyl)ammonium chloride,
dihexylmethyl(4-nitrosonaphthyl)ammonium bromide,
diethylpentyl(6-nitrosonaphthyl)ammonium iodide,
butyldipropyl(4-nitrosonaphthyl)ammonium fluoride,
butylhexylmethyl(5-nitrosonaphthyl)ammonium bromide,
trimethyl(3'-nitrosobiphenlyl)ammonium chloride,
triethyl(2'-nitrosobiphenylyl)ammonium fluoride,
tripropyl(3'-nitrosobiphenylyl)ammonium bromide,
tributyl(4'-nitrosobiphenylyl)ammonium iodide,
tripentyl(4'-nitrosobiphenylyl)ammonium chloride,
trihexyl(3'-nitrosobiphenylyl)ammonium fluoride,
dimethylhexyl(2'-nitrosobiphenylyl)ammonium bromide,
dihexylmethyl(4' - nitrosobiphenylyl)ammonium iodide,
and so forth.

Useful nitroso-substituted aromatic hydrocarbon derivatives of dialkylamines are, for example:
N,N-dimethyl-p-nitrosoaniline,
N,N-dihexyl-p-nitrosoaniline,
N-hexyl-N-methyl-p-nitrosoaniline,
N,N-diethyl-m-nitrosoaniline,
N,N-dipropyl-o-nitrosoaniline,
N,N-dibutyl-m-nitrosoaniline,
N,N-dipentyl-m-nitrosoaniline,
N-ethyl-N-pentyl-p-nitrosoaniline,
N-butyl-N-propyl-p-nitrosoaniline,
N-methyl-N-propyl-o-nitrosoaniline,
N,N-dimethylp-nitrosotoluidine,
N,N-dihexyl-m-nitrosotoluidine,
N-hexyl-N-methyl-o-nitrosotoluidine,
N.N-diethyl-m-nitrosotoluidine,
N,N-dipropyl-p-nitrosotoluidine,
N,N-dibutyl-o-nitrosotoluidine,
N,N-dipentyl-m-nitrosotoluidine,
N-ethyl-N-pentyl-p-nitrosotoluidine,
N-butyl-N-propyl-o-nitrosotoluidine,
N-methyl-N-propyl-m-nitrosotoluidine,
N,N-dimethyl-p-nitrosoxylidine,
N,N-dihexyl-p-nitrosoxylidine,
N-hexyl-N-methyl-p-nitrosoxylidine,
N,N-diethyl-m-nitrosoxylidine,
N,N-dipropyl-o-nitrosoxylidine,
N,N-dibutyl-p-nitrosoxylidine,
N,N-dipentyl-m-nitrosoxylidine,
N-ethyl-N-pentyl-p-nitrosoxylidine,
N-butyl-N-propyl-p-nitroxylidine,
N-methyl-N-propyl-m-nitroxylidine, 4-nitroso-N,N-dimethylnaphthylamine,
4-nitroso-N,N-dihexylnaphthylamine,
4-nitroso-N,N-diethylnaphthylamine,
4-nitroso-N,N-dipropylnaphthylamine,
4-nitroso-N,N-dibutylnaphthylamine,
4-nitroso-N,N-dipentylnaphthylamine,
4-nitroso-N-ethyl-N-pentylnaphthylamine,
4-nitroso-N-butyl-N-propylnaphthylamine,
4-nitroso-N-methyl-N-propylnaphthylamine,
4'-nitroso-N,N-dimethylbiphenylylamine,
4'-nitroso-N,N-dihexylbiphenylylamine,
4'-nitroso-N-hexyl-N-methylbiphenylamine,
4'-nitroso-N,N-diethylbiphenylamine,
4'-nitroso-N,N-dipropylbiphenylylamine,
4'-nitroso-N,N-dibutylbiphenylylamine,
4'-nitroso-N,N-dipentyl-biphenylylamine,
4'-nitroso-N-ethyl-N-pentylbiphenylamine,
4'-nitroso-N,N-diphenyl-biphenylylamine,
4'-nitroso-N-methyl-N-propylbiphenylylamine,
and so forth.

Useful alkyl halides are, for example: iodomethane, fluoroethane, 1-chloropropane, 1-bromobutane, 1-iodopentane, 1-fluorohexane, 2-chloropropane, 1-bromoisobutane, 2-iodo-2-methyl-propane, 2,2-dimethyl-1-fluoropropane, 1-bromoisopentane, and so forth.

In carrying out the process of this invention, the nitroso compound is simply contacted with the alkyl halide until the reaction is complete. It is an advantage in moderating the reaction to add one of the reactants slowly and gradually to the other, though the reactants may optionally be added all at once, preferably together with a solvent or diluent. Solvents or diluents which may be used to moderate the reaction and to facilitate stirring, and so forth, are alcohols, such as methanol, ethanol and propanol, for example.

The ratio of reactants may very, molar ratios of the nitroso compound to the alkyl halide compound of at least 1:10 to about 10:1 may be used, but since the reaction is equimolar, advantageously a 1:1 ratio of reactants is employed. Excess reactant may be removed at the end of the reaction by, for example, extraction or distillation.

Useful temperatures for conducting the preparation are, for example, the reflux temperature of the reaction mixture where solvents are used or any desired temperature from below 0° C. up to below the decomposition point of the ingredients of the reaction mixture. Atmospheric pressure is satisfactory for conducting the reaction, though sub- or super-atmospheric pressures may be used if desired, ranging from 0.05 millimeter of mecury to about 5,000 pounds per square inch.

No catalyst is required. Reaction time may vary. In general, it will depend on the nature of the reactants used and on the temperature of the reaction mixture. Ordinarily reaction times will vary from less than one minute to several hours.

The present new compounds are generally stable, well defined products, soluble in sulfoxides, such as dimethylsulfoxide and diethylsulfoxide, for example.

The new compounds are useful for a variety of agricultural and industrial uses; for example, trimethyl(p-nitrosophenyl)-ammonium iodide may be used as a mammalian toxicant and herbicide and is particularly effective as a bactericide.

The invention will be further described with reference to the following specific examples. These examples are given for purposes of illustration only and are not to be taken as in any way restricting the invention.

EXAMPLE 1

This example illustrates the preparation of a compound in accordance with this invention.

To a reaction flask containing 25 grams (g.) (about 0.17 mole) of N,N-dimethyl-p-nitrosoaniline in 200 milliliters (ml.) of 2-propanol is gradually added 23.7 g. (about 0.17 mole) of iodomethane. The mixture is refluxed for two and one-half hours to insure complete reaction and then filtered. The crude residue is washed several times with each of 2-propanol, acetone, and ether, then dried.

The resulting product is trimethyl (p-nitrosophenyl)-ammonium iodide, a uniformly green crystalline solid weighing 27 g. (about 55% theoretical yield), soluble in dimethylsulfoxide and melting at 154°–155° C.

Elemental analysis of this product confirms the assigned empirical formula $C_{19}H_{13}IN_2O$:

Calculated (percent): C, 37.0; H, 4.5; I, 43.5. Found (percent): C, 36.8; H, 4.0; I, 43.5.

EXAMPLE 2

This example describes the utilization of a compuond of this invention as a bactericide.

To test bactericidal activity, inoculations of *S. aureous, S. typhosa,* and *A. niger,* are made on agar substrates supporting the growth of these microorganisms, to which has been added varying amounts of trimethyl(p-nitrosophenyl)ammonium iodide. The inoculated plates are maintained under conditions supporting growth of these microorganisms. At concentrations of 1 part per 1,000 and 1 part per 10,000 in the agar, the ammonium compound causes substantially complete suppression of growth and reproduction of each of the microorganism species.

EXAMPLE 3

To test defoliant activity, Black Valentine bean plants, 4 to a pot, are grown to the stage of having 1 mature trifoliate and 1 partially opened trifoliate, and then sprayed with trimethyl(p-nitrosophenyl)ammonium iodide as an aqueous emulsion, at rates of 0.1 and 1.0 pound per acre (lbs./A.), using a dilution of 30 gallons per acre, after which the plants are maintained in a greenhouse within temperature limits of 70°–90° F. The plants are defoliated in the 50% range at both rates. Defoliation in the 51–75% range is observed when the same compound is applied to soybean plants at the rate of 10 lbs./A.

EXAMPLE 4

This example illustrates the use of a compound of this invention for the control of plant species.

Aluminum pan flats are filled with mixtures of two-third one-quarter mesh sieved soil, and one-third sand. Over one-third of the soil surface of each pan are scattered 20 seeds each of different kinds of grasses; seeds of broad-leaf plants are randomly scattered over the remaining surface. The seeds are then covered with soil to the pan top and the pan is sprayed with an aqueous solution of fertilizer and insecticides. The surfaces of the boxes are next sprayed with 30 ml. of a mixture of trimethyl (p-nitrosophenyl)ammonium iodide in acetone at a rate equal to 25 lbs./A. Then the pans are placed in water and allowed to absorb moisture until the soil surface is completely moist, after which they are held in a greenhouse under standard conditions of moisture and sunlight. After ten days, the number and species of plants which have germinated and grown are observed.

The ammonium compound produced substantially complete suppression of plant germination and growth on pigweed while it produced no effect on sugar beets and radishes.

EXAMPLE 5

This example illustrates the use of a compound of this invention as a pesticide for the destruction of lower animal life forms.

In insecticidal screening, activity for control of southern armyworms (*Prodenia cridania*) is demonstrated as follows. Lima bean leaf discs (7 mm. in diameter) are prepared by evaporating one microliter of an acetone solution containing trimethyl - (p-nitrosophenyl)ammonium iodide at a concentration of 10 mg./ml. on the surface of each leaf disc. A second instar armyworm larve is engaged with each leaf disc by using a ⅞ inch plastic cap (the leaf disc is small enough to permit complete consumption by the larva). The plastic caps containing the leaf discs and larvae are each individually put into clear plastic containers and held for 48 hours at ambient temperature. At the end of this period a 30% kill is produced by the ammonium compound, when tested in the above manner.

EXAMPLE 6

This example illustrates the use of a compound of this invention as a fungicide.

To screen for fungicidal activity against *Rhizoctonia solani*, a soil fungus causative of seedling blight, corn-meal sand cultures of this organism are blended into autoclave-sterilized soil to achieve essentially a mono-organism soil-type. Paper cups containing 30 g. samples of the mono-organism soil-type are each individually drenched with 4 ml. of a liquid containing 231 parts per million (p.p.m.) of trimethyl(p-nitrosophenyl)ammonium iodide, the product as provided in Example 1. The final concentration based on soil weight is 30 p.p.m. The paper cups containing the drenched soil samples together with paper cups containing undrenched soil samples are placed into an incubation chamber at 90%–100% relative humidity for 48 hours. At the end of this time the cups are removed from the incubation chamber and the samples observed for fungus growth.

Substantially complete suppression of fungus growth and reproduction is observed for the samples treated with the product of Example 1.

EXAMPLE 7

This example illustrates the use of a compound of the present invention as a mammalian toxicant.

The ammonium compound provided as described in Example 1 is placed in solution by dissolving 100 milligrams (mg.) of the compound in 10 ml. of an aqueous solution containing 10% of a polyethylene glycol having a molecular weight of 300. This solution is diluted with water to provide solutions of varying concentrations which are injected into mice intravenously. At 100 milligrams/kilogram (mg./kg.) (10 ml./kg.), the animals are killed, while at the lower rate of 32 mg./kg. (3.2 ml./kg.) the animals exhibit decreased locomotor activity. The ratio of median lethal dose to median effective dose ($LD_{50}/MED_{50}$) is determined to be 3.2.

The presently new compounds of this invention are generally applied for herbicidal and toxicant use in the form of sprays or aerosols. Useful sprays may be prepared by dispersing the present products in water with the aid of a wetting agent, to prepare aqueous dispersions which may be employed as sprays. For example, a solution containing cyclohexanone and a polyalkylene glycol ether long chain alkyl benzene sulfonate emulsifier may be used to prepare such dispersions or emulsions. The products may also be applied as oil-in-water emulsion sprays. The present products may also be dissolved or dispersed in liquified gases such as fluorochloroethanes or methyl chloride and applied to plants or other pest organism hosts from aerosol bombs. Instead of employing liquids as carriers, and diluents, herbicidal dusts which contain the present novel compounds as active ingredients may be prepared, for example, by incorporating the new products of this invention with a solid carrier such as talc, bentonite, fuller's earth, and so forth.

The amount of the active toxicant compound in the composition as applied will vary with the active ingredients, the manner of application, the species to be destroyed and the resistance of the plants to be sprayed, for example, and formulation and ratio of applications are suitably adjusted in accordance with these factors.

It is apparent that this invention may be extended to areas beyond those specifically described and that many widely differing embodiments can be made without departing from the spirit and scope thereof as defined herein. Therefore, it is not intended to be limited except as indicated by the appended claims.

What is claimed is:

1. A method for controlling the growth of soil fungi comprising applying to the soil a fungicidal amount of a compound of the formula

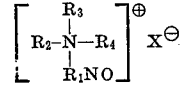

wherein $R_1$ represents bivalent aromatic hydrocarbon radicals of from 6 to 12 carbon atoms, each of $R_2$, $R_3$ and $R_4$ represents alkyl radicals of from 1 to 6 carbon atoms and X represents a halogen element of atomic weight below 130.

2. A method of claim 1 wherein $R_2$, $R_3$ and $R_4$ are each methyl, $R_1NO$ is p-nitrosophenyl and X is iodine.

References Cited

UNITED STATES PATENTS

| | | | |
|---|---|---|---|
| 2,954,314 | 9/1960 | Metzger et al. | 424—329 |
| 3,028,301 | 4/1962 | Winicon | 424—329 |
| 3,390,178 | 6/1968 | Hyatt | 260—567.6M |

ALBERT T. MEYERS, Primary Examiner

V. D. TURNER, Assistant Examiner

U.S. Cl. X.R.

71—70, 121